US012196859B2

(12) United States Patent
Najmark et al.

(10) Patent No.: US 12,196,859 B2
(45) Date of Patent: Jan. 14, 2025

(54) LABEL TRANSFER BETWEEN DATA FROM MULTIPLE SENSORS

(71) Applicant: Google LLC, Mountain View, CA (US)

(72) Inventors: Sarah Najmark, Palo Alto, CA (US); Sean Kirmani, Mountain View, CA (US)

(73) Assignee: Google LLC, Mountain View, CA (US)

( * ) Notice: Subject to any disclaimer, the term of this patent is extended or adjusted under 35 U.S.C. 154(b) by 874 days.

(21) Appl. No.: 17/185,414

(22) Filed: Feb. 25, 2021

(65) Prior Publication Data

US 2022/0268939 A1      Aug. 25, 2022

(51) Int. Cl.
  *G01S 17/89*   (2020.01)
  *G01S 17/93*   (2020.01)
  *G06F 18/214*  (2023.01)
  *H04L 67/12*   (2022.01)

(52) U.S. Cl.
  CPC .............. *G01S 17/89* (2013.01); *G01S 17/93* (2013.01); *G06F 18/2155* (2023.01); *H04L 67/12* (2013.01)

(58) Field of Classification Search
  None
  See application file for complete search history.

(56) References Cited

U.S. PATENT DOCUMENTS

| | | | |
|---|---|---|---|
| 8,290,305 B2 | 10/2012 | Minear et al. | |
| 8,605,998 B2 | 12/2013 | Samples et al. | |
| 9,098,773 B2 | 8/2015 | Huang et al. | |
| 9,282,321 B2 | 3/2016 | Sandrew et al. | |
| 9,904,867 B2 | 2/2018 | Fathi et al. | |
| 10,452,949 B2 | 10/2019 | Jia et al. | |
| 10,663,594 B2 | 5/2020 | Tsishkou et al. | |
| 2009/0232388 A1 | 9/2009 | Minear et al. | |
| 2013/0286017 A1 | 10/2013 | Sanjuan et al. | |
| 2017/0103510 A1 | 4/2017 | Wang et al. | |
| 2019/0026957 A1 | 1/2019 | Gausebeck | |
| 2020/0210887 A1* | 7/2020 | Jain ....................... G01S 7/4972 |

OTHER PUBLICATIONS

Yalniz "Billion-scale semi-supervised learning for image classification", arXiv:1905.00546v1 [cs.CV] May 2, 2019 (Year: 2019).*

(Continued)

*Primary Examiner* — Hovhannes Baghdasaryan
(74) *Attorney, Agent, or Firm* — McDonnell Boehnen Hulbert & Berghoff LLP

(57) ABSTRACT

A method includes receiving first sensor data captured by a first sensor. The method further includes receiving a plurality of labels or predictions corresponding to the first sensor data. The method also includes receiving second sensor data captured by a second sensor. The method further includes determining time-synchronized sensor data comprising a subset of the first sensor data and a subset of the second sensor data. The method additionally includes determining, based on the plurality of labels or predictions and the time-synchronized sensor data, a plurality of pseudo-labels corresponding to the second sensor data. The method also includes generating a training data set comprising at least the subset of the second sensor data and one or more pseudo-labels from the plurality of pseudo-labels.

18 Claims, 10 Drawing Sheets

(56) References Cited

OTHER PUBLICATIONS

Li et al., "Real-time 3D object proposal generation and classification using limited processing resources," Robotics and Autonomous Systems, 2020, 12 pages, vol. 130.

Çiçek et al., "3D U-Net: Learning Dense Volumetric Segmentation from Sparse Annotation," arXiv:1606.06650v1, Jun. 21, 2016, 8 pages.

Huang et al., "PerspectiveNet: 3D Object Detection from a Single RGB Image via Perspective Points," arXiv:1912.07744v1, Dec. 16, 2019, 13 pages.

Lin et al., "A novel point cloud registration using 2D image features," EURASIP Journal on Advances in Signal Processing, 2017, 11 pages, vol. 5.

Mousavian et al., "3D Bounding Box Estimation Using Deep Learning and Geometry," arXiv:1612.0049v2, Apr. 10, 2017, 10 pages.

Qi et al., "Deep Hough Voting for 3D Object Detection in Point Clouds," arXiv:1904.09664v2, Aug. 22, 2019, 14 pages.

Shi et al., "PointRCNN: 3D Object Proposal Generation and Detection from Point Cloud," arXiv:1812.04244v2, May 16, 2019, 10 pages.

Tang et al., "Transferable Semi-supervised 3D Object Detection from RGB-D Data," arXiv:1904.10300v1, Apr. 23, 2019, 16 pages.

Wang et al., "Fusing Bird's Eye View LIDAR Point Cloud and Front View Camera Image for Deep Object Detection," arXiv:1711.06703v3, Feb. 14, 2018, 12 pages.

Wang et al., "LDLS: 3D Object Segmentation through Label Diffusion from 2D Images," IEEE Robotics and Automation Letters, Preprint Version, Accepted May 2019, arXiv:1910.13955.v1, Oct. 30, 2019, 8 pages.

Wang et al., "SGPN: Similarity Group Proposal Network for 3D Point Cloud Instance Segmentation," arXiv.1711.08588v2, May 30, 2019, 13 pages.

Yi et al., "GSPN: Generative Shape Proposal Network for 3D Instance Segmentation in Point Cloud," arXiv:1812.03320v1, Dec. 8, 2018, 13 pages.

Zhou et al., "VoxelNet: End-to-End Learning for Point Cloud Based 3D Object Detection," arXiv1711.06396v1, Nov. 17, 2017, 10 pages.

Ding et al., "Semantic Segmentation of Indoor 3D Point Cloud with SLENet," The International Archives of the Photogrammetry, Remote Sensing and Spatial Information Sciences, ISPRS Geospatial Week 2019, The Netherlands, 2019, pp. 785-791, vol. XLII—2/W13.

Piewak et al., "Boosting LiDAR-Based Semantic Labeling by Cross-modal Training Data Generation," ECCV 2018 Workshops, LNCS 11134, 2019, pp. 497-513.

Xie et al., "Semantic Instance Annotation of Street Scenes by 3D and 2D Label Transfer," 2016 IEEE Conference on Computer Vision and Pattern Recognition, 2016, pp. 3688-3697.

\* cited by examiner

LABEL TRANSFER BETWEEN DATA FROM MULTIPLE SENSORS

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Example embodiments involve a label transfer process between data from two sensors. A computing device may receive sensor data from a first sensor and second sensor data from a second sensor. The computing device may also receive human-generated labels or computer-generated predictions corresponding to the first sensor data. The computing device may synchronize the first sensor data and second sensor data, determine pseudo-labels for the second sensor data based on the labels or predictions for the first sensor data, and generate a training data set.

In an embodiment, a method includes receiving first sensor data captured by a first sensor. The method additionally includes a plurality of labels or predictions corresponding to the first sensor data. The method also includes receiving second sensor data captured by a second sensor. The method further includes determining time-synchronized sensor data comprising a subset of the first sensor data and a subset of the second sensor data. The method additionally includes determining, based on the plurality of labels or predictions and the time-synchronized sensor data, a plurality of pseudo-labels corresponding to the second sensor data. The method also includes generating a training data set comprising at least the subset of the second sensor data and one or more pseudo-labels from the plurality of pseudo-labels.

In another embodiment, a system includes a first sensor, a second sensor, and a computing device. The computing device may be configured to receive first sensor data captured by a first sensor. The computing device may also be configured to receive a plurality of labels or predictions corresponding to the first sensor data. The computing device may also be configured to receive second sensor data captured by the second sensor. The computing device may further be configured to determine time-synchronized sensor data comprising a subset of the first sensor data and a subset of the second sensor data. The computing device may additionally be configured to determine, based on the plurality of labels or predictions and the time-synchronized sensor data, a plurality of pseudo-labels corresponding to the second sensor data. The computing device may also be configured to generate a training data set comprising at least the subset of the second sensor data and one or more pseudo-labels from the plurality of pseudo-labels.

In a further embodiment, a non-transitory computer readable medium is provided which includes programming instructions executable by at least one processor to cause the at least one processor to perform functions. The functions include receiving first sensor data captured by a first sensor. The functions further include receiving a plurality of labels or predictions corresponding to the first sensor data. The functions also include receiving second sensor data captured by a second sensor. The functions further include determining time-synchronized sensor data comprising a subset of the first sensor data and a subset of the second sensor data. The functions additionally include determining, based on the plurality of labels or predictions and the time-synchronized sensor data, a plurality of pseudo-labels corresponding to the second sensor data. The functions also include generating a training data set comprising at least the subset of the second sensor data and one or more pseudo-labels from the plurality of pseudo-labels.

In a further embodiment, a system is provided that includes means for receiving labeled sensor data captured by a first sensor. The system further includes means for receiving a plurality of labels or predictions corresponding to the first sensor data. The system also includes means for receiving second sensor data captured by a second sensor. The system further includes means for determining time-synchronized sensor data comprising a subset of the first sensor data and a subset of the second sensor data. The system additionally includes means for determining, based on the plurality of labels or predictions and the time-synchronized sensor data, a plurality of pseudo-labels corresponding to the second sensor data. The system also includes means for generating a training data set comprising at least the subset of the second sensor data and one or more pseudo-labels from the plurality of pseudo-labels.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
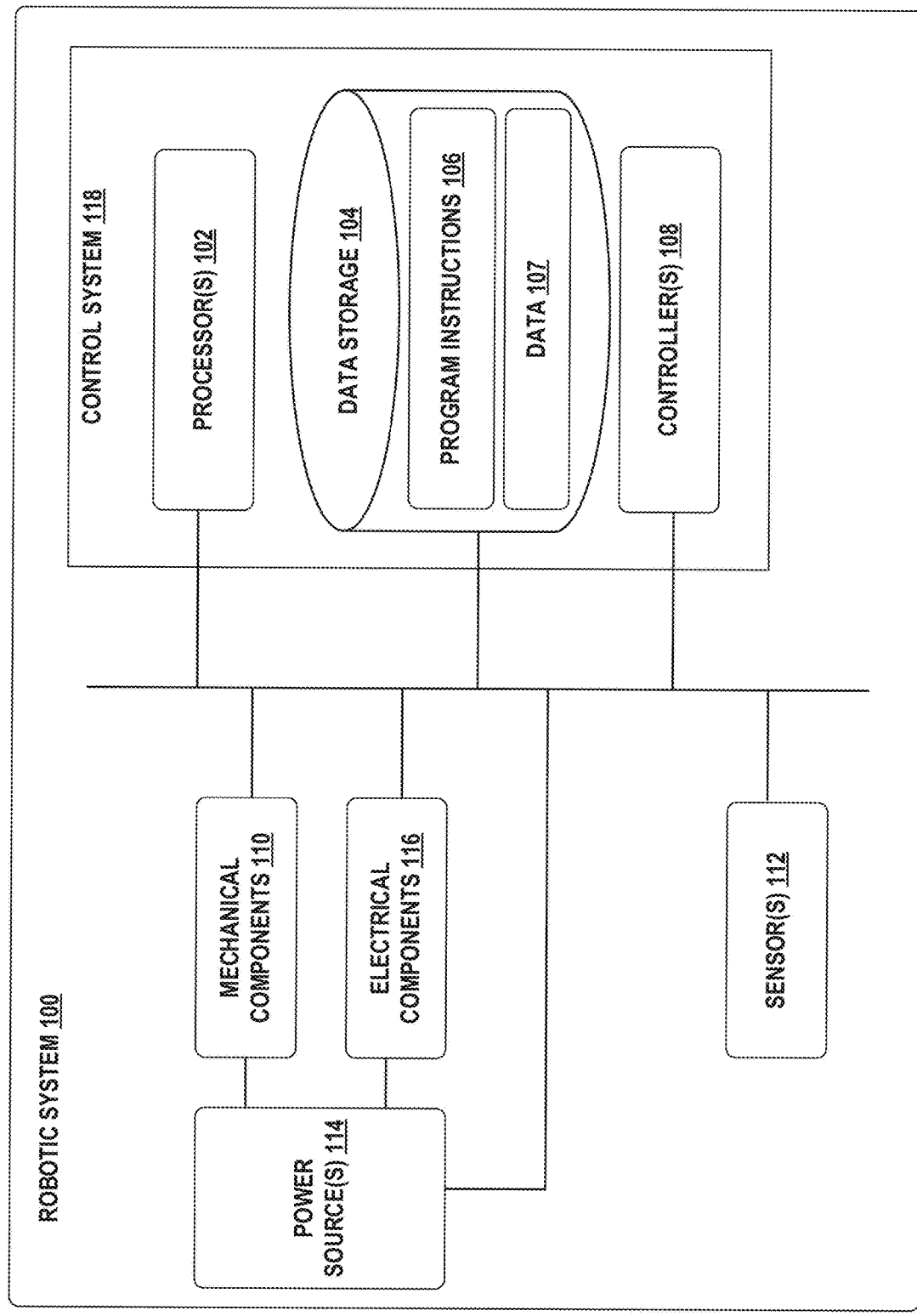
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

A robotic device is often equipped with sensors, e.g., red green blue (RGB) sensors, red green blue depth (RGB-D) sensors and/or LIDAR sensors, which may be used to aid the robotic device in navigating around its surroundings and performing various tasks. In order to derive useful information from the sensor data, a robotic device may first need to detect areas where objects are present and/or identify objects in the surroundings. This identification and categorization is often done using supervised machine learning. A model used for supervised machine learning may contain thousands to billions of trainable parameters. These trainable parameters may be adjusted based on the predictions that the model generates from sensor data inputs and provided labels corresponding to the sensor data inputs. With larger and larger models being developed for more accurate predictions, the amount of training data needed also increases to facilitate generalization and discourage memorization by the model. Further, because the parameters in the model are adjusted based on the provided labels, the identification and classification of objects in the environment may depend heavily on the quality of the provided labels.

Initial labeling for training data sets is often done by humans, but this process may be labor intensive and expensive, particularly for larger models that necessitate larger training data sets. In an example annotation process for detection and labeling, a robotic device may collect two-dimensional (2D) image data using one or more RGB sensors. A human may be provided with a user interface in order to outline a bounding box where an object is situated and perhaps may label a property of the object, e.g., that the object inside the bounding box is a flower pot. Many hours of human labeling with this process may be required to produce a large data set that can be used effectively with a supervised machine learning model. Further, humans may have difficulty labeling data with high accuracy, particularly when the data is sparse, for example point cloud data collected from LIDAR sensors.

Provided herein are methods for transferring labels between data from a first sensor to data from a second sensor, such that manual labeling can be done on data that is easier to label and later transferred to data that is more difficult to label. In some examples, the first sensor could be an RGB sensor that collects 2D image data and the second sensor could be a LIDAR sensor that collects three-dimensional (3D) data in the form of sparse point clouds. The 2D image data from the RGB sensor may be easier to label through human-assisted processes and/or previously developed algorithms than the sparse point cloud. Accordingly, the labels could be transferred from the 2D image data of the RGB sensor to the 3D sparse point cloud data of the LIDAR sensor using the methods described below. In these cases, the LIDAR sensor data may be of a wider field of view than the RGB sensor data.

The methods included herein may also be modified to accommodate transferring labels between other types of sensors with differing properties (e.g., fields of view). In some examples, the first sensor could be a LIDAR sensor that collects 3D data in the form of sparse point clouds, which is then labeled through a human or machine assisted process. The labels can then be transferred to the second sensor data, which could be collected using an RGB sensor. In some cases, the first sensor with readily labeled data may have a wider field of view than the second sensor, and the method may be modified accordingly. Other sensor specifications may also differ (e.g., rate of data collection), and the methods may be further modified to accommodate these differences, some of which are described below.

Due to these differing sensor specifications, issues may arise in attempting label transfer between data from multiple sensors, so additional operations may be performed to remediate these issues and calibrate the data prior to transferring labels. In some examples, data from the two sensors may be collected during a same or similar time period and data from one sensor may be readily labeled using an automated labeling process or a human-assisted labeling process. However, during a similar time period, each sensor may collect data at similar and/or different points in time. For example, a first and second sensor could start collecting data at the same time, but the first sensor could collect sensor data every four seconds whereas the second sensor could collect sensor data every two seconds. While the data collected every four seconds could be of similar points in time, half of the data from the second sensor would lack corresponding first sensor data. In other examples, the data from each sensor could be slightly offset from each other, for example, if the first sensor starts collecting data slightly later than the second sensor.

In these examples, the sensor data could be synchronized by applying a time threshold between the sensor samples, so that samples collected with a time difference above the time threshold would be removed, and labels would be transferred only between samples collected with a time difference within the time threshold. For example, each sample could be timestamped. A sample could be collected from the first sensor at 3:20:00 PM and another at 3:20:30 PM, and a sample could be collected from the second sensor at 3:20:01 PM and another at 3:20:50 PM. With a time threshold of five seconds, the first sensor sample collected at 3:20:00 PM and the second sensor sample collected at 3:20:01 PM could be included in the subset of first and second sensor data to be used in the label transferring process. However, the first sensor data collected at 3:20:30 PM and the second sensor data collected at 3:20:50 PM would not be included in the subset of first and second sensor data to be used for label transferring. This temporal alignment process may facilitate more accurate transfer of labels such that discrepancies between the first sensor data and the second sensor data are removed.

In addition to having temporal differences, the first and second sensor data may also differ spatially. For example, the first sensor could have a wider field of view than the second sensor, or vice versa. If the sensor with the wider field of view is labeled, then the labels outside the field of view of the other sensor could be ignored during the label transfer process. If the sensor with the more narrow field of view captures data that is later labeled using the machine or human assisted process, then the other sensor with the wider field of view could be cropped to the overlapping fields of view. Similarly, if the first sensor and the second sensor collect data of similar overlapping areas of an environment but nevertheless have areas in the sensor data that are not included in the other sensor data, then data from both sensors could be cropped such that only the overlapping parts of the environment are included.

With temporal and spatial discrepancies in the data from the two sensors resolved, labels or predictions associated with the first data set from the first sensor may be transferred to pseudo-labels for the second data set from the second sensor. The labels for the first data set could be obtained through a human-assisted labeling process, or predictions for the first data set could be generated by an automated process. The transfer of labels or predictions from the first data set into pseudo-labels for the second data set may also be an automated process. In some examples, the first sensor is an RGB sensor and the second sensor is a LIDAR sensor. If the data from the RGB sensor is annotated with one or more 2D bounding boxes indicating areas with objects, then these bounding boxes could be projected to the unlabeled LIDAR sensor data as 3D bounding boxes indicating areas with objects using geometric transformations. The RGB sensor could be an RGB-D sensor that includes depth data, and the depth data could be used in conjunction with the 2D data and 2D bounding boxes to generate the 3D bounding boxes.

As used herein, labels are used to refer to designations generated through human-assisted processes (e.g., generated by a human through a user interface), predictions are used to refer to designations generated through automated processes (e.g., generated using a machine learning model), and pseudo-labels are used to refer to designations that are transferred labels and/or predictions (e.g., generated through an automated transfer process).

Based on the transferred pseudo-labels, a training data set may be obtained to be used in a machine learning model. The training data set could include data from the second sensor and the transferred pseudo-labels corresponding to the data from the second sensor. A machine learning model trained with this training data set could then be used to make predictions without human input. For example, if the second sensor is a LIDAR sensor, the model may then take as an input LIDAR data and output coordinates corresponding to areas where objects are present. For any given type of sensor data, it may be advantageous to choose a machine learning model that can process data quickly such that the predictions can be quickly generated when the robotic device is being deployed.

In some cases, some of the pseudo-labels may be validated, and only the pseudo-labels and corresponding data that have passed the validation function are included in the training data set. This pseudo-label validation function could be based on a quality metric associated with the transferred pseudo-labels in relation to the second sensor data. For example, if the first sensor is an RGB sensor and the second sensor is a LIDAR sensor, and the pseudo-labels are transferred from data collected by the first sensor to data collected by the second sensor, then a transferred pseudo-label may refer to a bounding box that corresponds with an area in a point cloud. Points within the bounding box may be potentially representative of an object in the corresponding RGB sensor data. The number of points within the bounding box may be associated with the quality metric. More specifically, the transferred pseudo-labels (e.g., the bounding boxes corresponding to LIDAR data) may be validated by requiring more than a threshold number of points in each transferred pseudo-label. Sensor data and pseudo-labels failing to satisfy the threshold number of points may be removed so as to not reduce the quality of pseudo-labels in the training set.

In further examples, to obtain a more accurate data set and consequently a model that can predict more accurate pseudo-labels, a confidence score may be used to separate the data into two sets: one set corresponding to higher quality data and another set corresponding to lower quality data. The higher quality data could be used to train a model, whereas the lower quality data could be used for validation or to train the model in an unsupervised manner. The portions of the lower quality data could be incorporated back into the data set based on which samples of sensor data in the unsupervised data set give the highest confidence scores. Further, samples initially associated with low confidence scores may be associated with higher confidence scores later as the model improves through the training process.

Using temporal and spatial synchronization, frame transformation, and a heuristics-based validation process to obtain training data sets may be advantageous to traditional methods in several aspects. Namely, the training data set can be obtained with no human in the loop, i.e., the label transfer process may be performed without any human input. In some examples, obtaining the initial labels for the first sensor data may be done in a machine-assisted manner (e.g., through use of a machine learning algorithm) and the label transfer process is also machine-assisted based on synchronization, frame transformation, and heuristics. The machine learning algorithm may need to be trained on human labeled data initially, but afterwards, the machine learning algorithm could generate labels continuously for any input data. Accordingly, the training data set could be generated continuously by a machine for a number of data points so long as labeled data from the first sensor and unlabeled data from the second sensor are provided, thereby reducing the hours and cost of labeling, particularly when compared with a process done by humans. Furthermore, because the quality of labels depends primarily on the label transfer process and the thresholds used for synchronization and validation, the method can be easily refined and the quality of labels improved. Although the examples herewith may specifically be directed towards label transfer between 2D and 3D data, the method is dynamic and can be adjusted to fit many different scenarios through modifying synchronization and validation thresholds.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a body may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
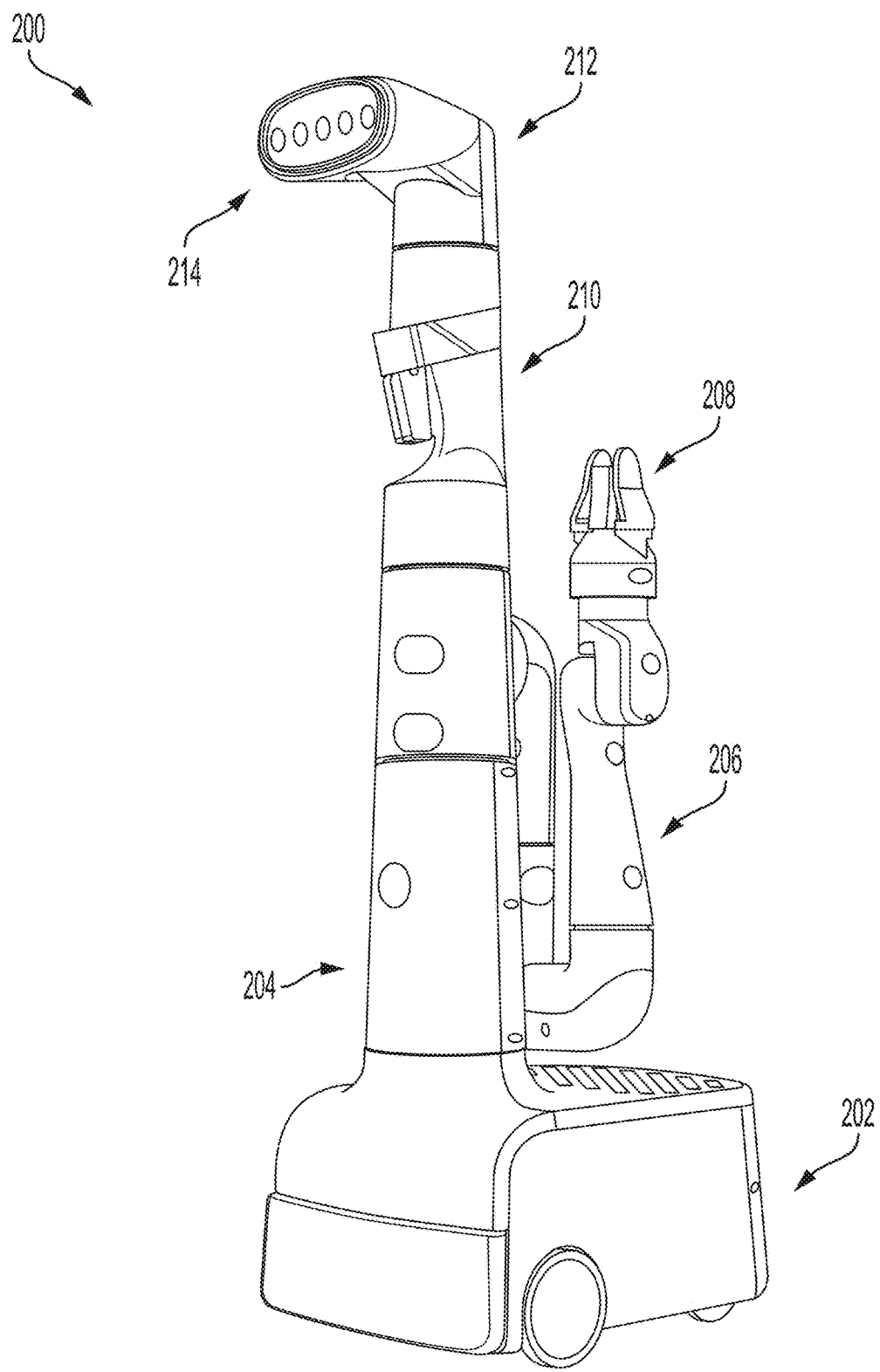
FIG. 2 illustrates a mobile robot, in accordance with example embodiments.
Figure 3:
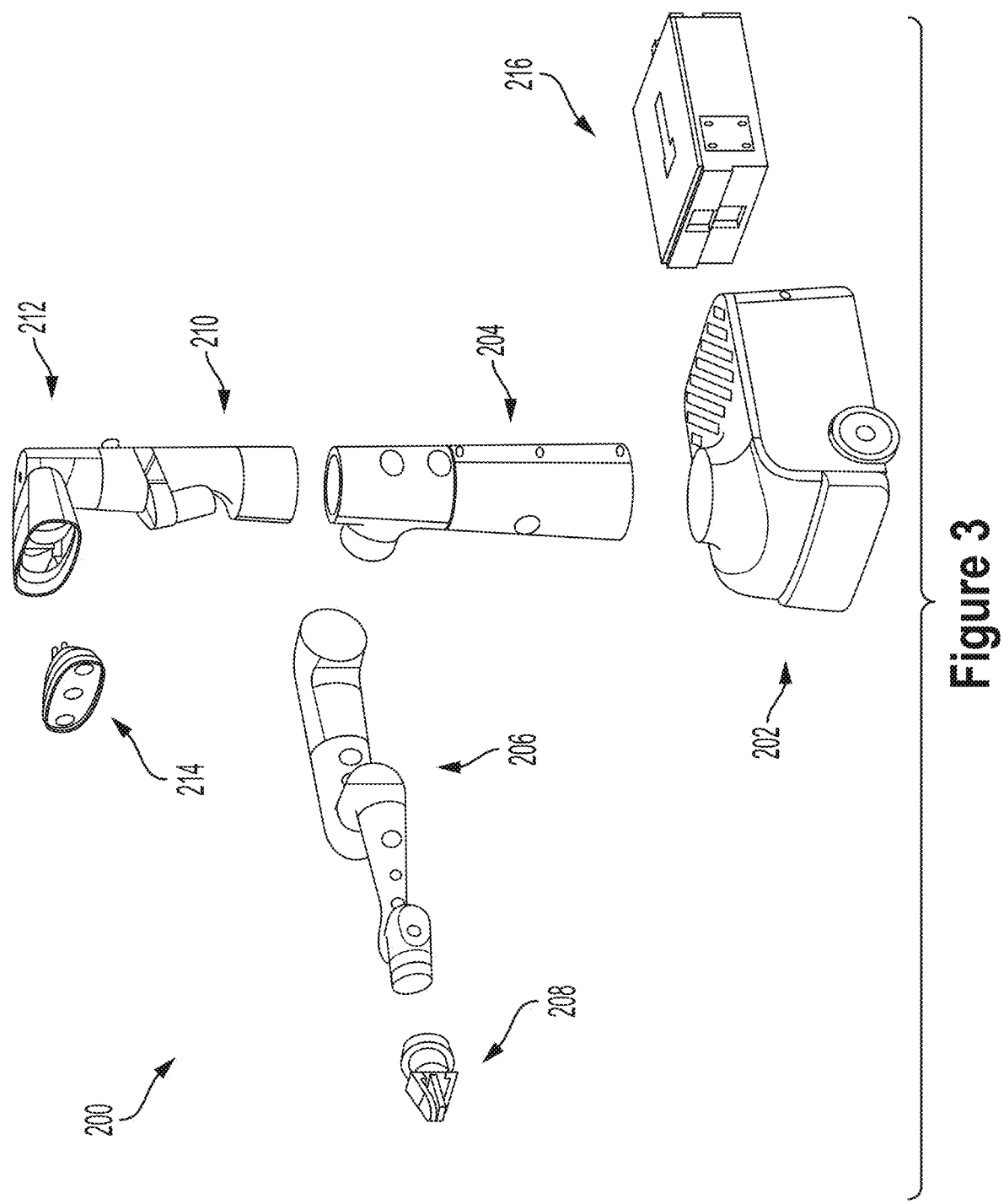
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared (IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
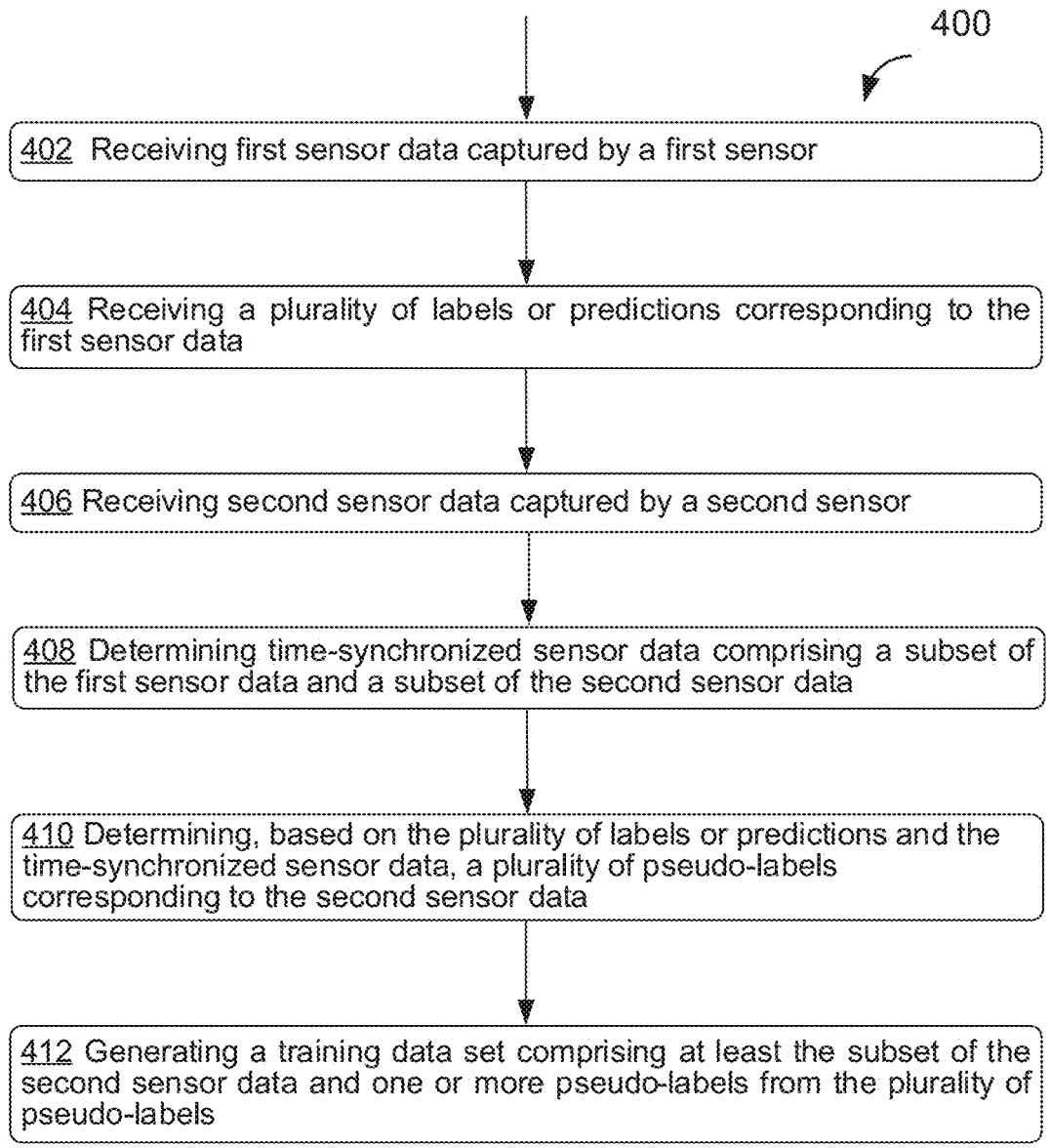
FIG. 4 illustrates a block diagram of a method, in accordance with example embodiments.

FIG. 4 is a block diagram of a method, in accordance with example embodiments. In some examples, method 400 of FIG. 4 may be carried out by a control system, such as control system 118 of robotic system 100. In further examples, method 400 of FIG. 4 may be carried out by a computing device or a server device remote from the robotic device. In still further examples, method 400 may be carried out by one or more processors, such as processor(s) 102, executing program instructions, such as program instructions 106, stored in a data storage, such as data storage 104. Execution of method 400 may involve a robotic device, such as the robotic device illustrated and described with respect to FIGS. 1-3. Further, execution of method 400 may involve a computing device or a server device remote from the robotic device and robotic system 100. Other robotic devices may also be used in the performance of method 400. In further examples, some or all of the blocks of method 400 may be performed by a control system remote from the robotic device. In yet further examples, different blocks of method 400 may be performed by different control systems, located on and/or remote from a robotic device.

At block 402, method 400 includes receiving first sensor data captured by a first sensor. At block 404, method 400 includes receiving a plurality of labels or predictions corresponding to the first sensor data. A robotic device may include the first sensor from which the first sensor data is captured, for example, robot 200 may include the first sensor in perception suite 214 or EOAS 208. The captured images may be labeled on the robotic device through a machine-assisted process (for a plurality of predictions) or human-assisted process (for a plurality of labels). Alternatively, the captured images may be sent to a server or other computing device to be labeled through a machine-assisted process (e.g., an automatic labeling process run on a computing device, perhaps by applying a machine learning model) or human-assisted process. Alternatively or additionally, the captured images may be captured by one or more robotic devices, labeled, and stored to be used subsequently for processes such as method 400 and/or others.

At block 406, method 400 includes receiving second sensor data captured by a second sensor. The robotic device may further include the second sensor from which the second sensor data is captured, for example, robot 200 may include the second sensor in perception suite 214 or EOAS 208.

As mentioned above, the first sensor and the second sensor may be different types of sensors and may have different properties. Examples described herein largely involve the first sensor as a RGB sensor and the second sensor as a LIDAR sensor, where the RGB sensor has a smaller field of view than the LIDAR sensor. The RGB sensor may collect 2D data whereas the LIDAR sensor may collect point cloud data. In further examples, the first sensor may be an RGB sensor and the second sensor may also be an RGB sensor, and these sensors may have the same or different fields of views. In still further examples, the first sensor may be a LIDAR sensor and the second sensor may also be a LIDAR sensor, and the sensors may have the same or different fields of view. In some examples, the first sensor may be a LIDAR sensor and the second sensor may be an RGB sensor, which may have the same or different fields of views. Other sensors may be involved, and other sensor pairings may be used.

At block 408, method 400 includes determining time-synchronized sensor data comprising a subset of the first sensor data and a subset of the second sensor data. As mentioned above, each sensor may collect data at similar and different points in time, and it may be beneficial to synchronize the data so that a first sample collected from a first sensor is within a threshold time difference of a second sample collected from a second sensor. These subsets may be proper or improper subsets. In some examples, each sample in the first sample data may have a corresponding sample in the second sample data that was collected within a threshold time difference of each other and vice versa. Then, the subsets may be improper subsets (e.g., the subset of the first sensor data is unchanged from the first sensor data and the subset of second sensor data is unchanged from the second sensor data). In further cases, each sample within the first sensor data has a corresponding sample in the second sample data that was collected within a threshold time difference of each other, but not in reverse. Thus, the subset of first sensor data may be an improper subset and the subset of the second sensor data may be a proper subset. The same may be true in reverse, such that the subset of the first sensor data is a proper subset and the subset of second sensor data is not a proper subset. Still alternatively, the subset of first sensor data and the subset of second sensor data may both be proper subsets.

At block 410, method 400 includes determining, based on the plurality of labels or predictions and the time-synchronized sensor data, a plurality of pseudo-labels corresponding to the second sensor data. For example, in a case where the first sensor is a RGB sensor and the second sensor is a LIDAR sensor, the plurality of labels or predictions may be 2D bounding boxes that indicate objects. A computing system may use geometric transformations to project the 2D bounding boxes to the unlabeled point cloud data collected by the LIDAR sensor and determine 3D bounding boxes (i.e., the plurality of pseudo-labels) that correspond to locations in the point cloud data collected by the LIDAR sensor. This process could incorporate depth information collected by the RGB sensor (for instance, when the RGB sensor is an RGB-D sensor). Alternatively, this process could incorporate depth information obtained by the LIDAR sensor. In some examples, the first sensor may be a LIDAR sensor and the second sensor may be an RGB sensor. The plurality of labels or predictions may be 3D bounding boxes that indicate objects. A computing system may use geometric transformations to project the 3D bounding boxes to the unlabeled RGB data collected by the RGB sensor and determine 2D bounding boxes (i.e., the plurality of pseudo-labels) that correspond to locations in the point cloud data collected by the RGB sensor. Accordingly, this label transfer process may be bi-directional and apply to various sensor pairs.

At block 412, method 400 includes generating a training data set comprising at least the subset of the second sensor data and one or more pseudo-labels from the plurality of pseudo-labels. The training data set may include a subset of the data from the second sensor and the corresponding transferred pseudo-labels. A machine learning model may be trained with this training data set to predict predictions for data collected by the second sensor. In examples where the first and second sensor data have slightly different views and the second sensor data is cropped, the uncropped second sensor data with the pseudo-labels corresponding to the cropped second sensor data may be included in the training data set. Alternatively, the cropped second sensor data with the corresponding pseudo-labels may be included in the training data set in lieu of the uncropped second sensor data.

As mentioned above, the process of transferring predictions or labels from data of a first sensor to data from another sensor may differ depending on the type and properties of the first sensor as well as the type and properties of the second sensor. Blocks of method 400 may be rearranged as necessary depending on the types of sensors and the types of data collected. Other functions (e.g., validation) may be added at any point in method 400 as dictated by sensor properties, data properties, and application of the data.

Figure 5:
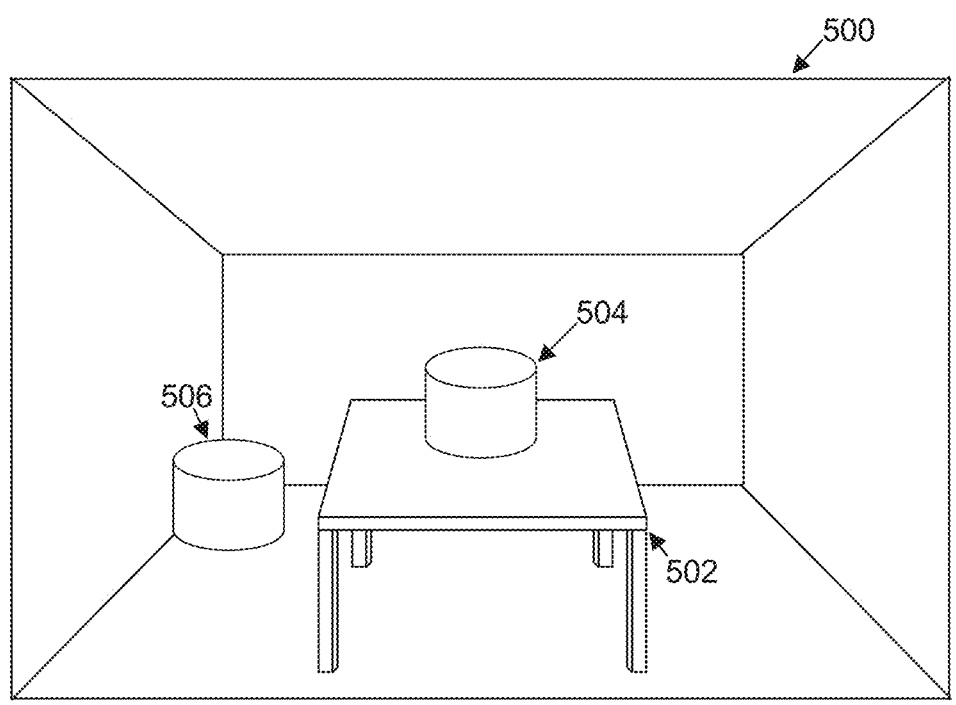
FIG. 5 illustrates a view of an environment, in accordance with example embodiments.

FIG. 5 depicts example environment 500 in which a robotic device, e.g., robot 200, may be operating. Example environment 500 includes object 506 located on the floor, as well as object 504 which is located on top of table 502. In an example situation, the robotic device may be operating in example environment 500. The robotic device may collect sensor data using two or more different sensors to assist in generating the training data set described in block 410 of method 400.

Figure 6A:
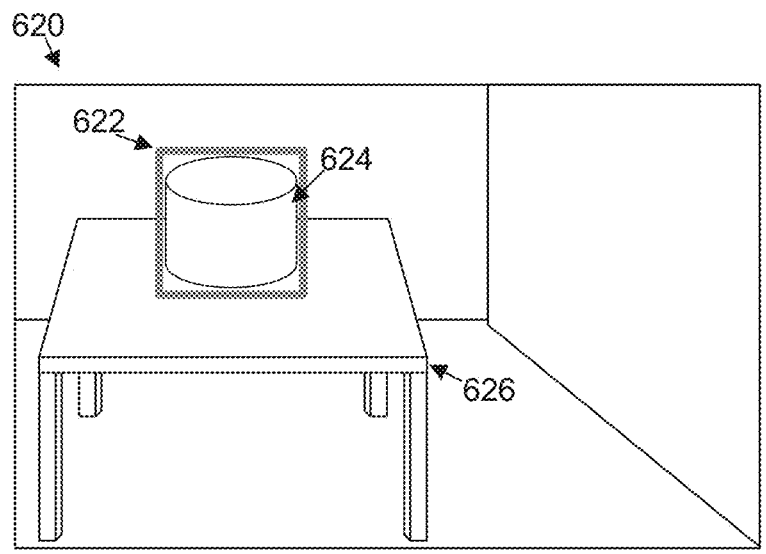
FIG. 6A illustrates first sensor data captured from a first sensor, in accordance with example embodiments.
Figure 6B:
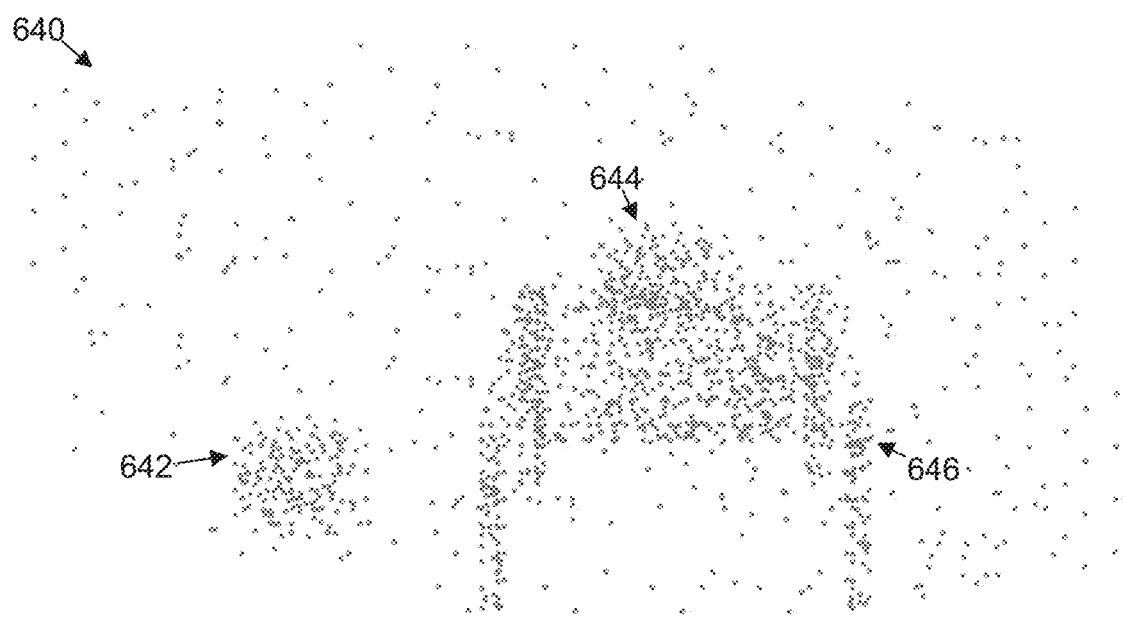
FIG. 6B illustrates second sensor data captured from a second sensor, in accordance with example embodiments.

FIG. 6A depicts labeled sample 620 of first sample data captured from a first sensor in environment 500, where the first sensor is an RGB sensor. FIG. 6B depicts sample 640 of second sensor data captured from a second sensor in environment 500, where the second sensor is a LIDAR sensor. In addition to FIGS. 6A and 6B, FIGS. 7-10 also involve environment 500, the first sensor being an RGB sensor, and the second sensor being a LIDAR sensor, but as mentioned above, there may be other examples of first and second sensors and other examples of data collected from the first and second sensors. Further, the labels may be predictions based on applying a machine learning model to the first sensor data, rather than labels generated through a human-assisted process.

In reference to FIG. 6A, labeled sample 620 depicts environment 500 as captured from an RGB sensor and includes object element 624 and table element 626. Object element 624 may correspond with object 504, and table element 626 may correspond with table 502. Labeled sample 620 also includes bounding box 622, indicating that an object is present within the area of bounding box 622. In practice, bounding box 622 may be a set of coordinates representing locations in labeled sample 620. Bounding box 622 may have been determined using a machine-assisted or human-assisted process.

The human or machine-assisted labeling of labeled sample 620 and other data from the first sensor may be performed by the same computing device and/or robotic device as the blocks of method 400 or a different computing device and/or robotic device as the blocks of method 400. In some examples, a server device may receive the first sensor data from a robotic device, then send the first sensor data to be labeled remotely, and receive the labels from the remote device. In further examples, a robotic device may receive the first sensor data from a first sensor on the robotic device, send the first sensor data to be labeled from a remote device, and then receive the labels from the remote device. In still further examples, the server device and/or the robotic device may label the data using a human or machine-assisted process locally.

In reference to FIG. 6B, a LIDAR sensor on the robotic device may capture sample 640 representative of environment 500. Sample 640 includes point cloud cluster 642, point cloud cluster 644, and point cloud cluster 646. Point cloud cluster 642 may correspond to object 506, point cloud cluster 644 may correspond with object 504, and point cloud cluster 646 may correspond with table 502 of environment 500. Sample 640 may be point cloud data captured from the same location or approximately the same location as labeled sample 620. The LIDAR sensor data may be received by the same device receiving the labels or predictions of the first sensor data, whether that be a robotic device using a second sensor on the robotic device or a server device connected to the robotic device.

It may be noted that labeled sample 620 has several differences from sample 640. For example, the individual objects in sample 640 may be more difficult to differentiate compared to labeled sample 620 due to the type of sensor used to collect the data for each respective sample. Further, the field of view of sample 640 is wider than that of labeled sample 620. While sample 640 contains point cloud cluster 642 representative of object 506, this object is outside of the field of view of the sensor used to capture labeled sample 620, and consequently such a representation is absent from labeled sample 620. These differences and potentially other differences that may be present in data collected from different sensors may influence the label transfer process discussed herein.

Figure 7:
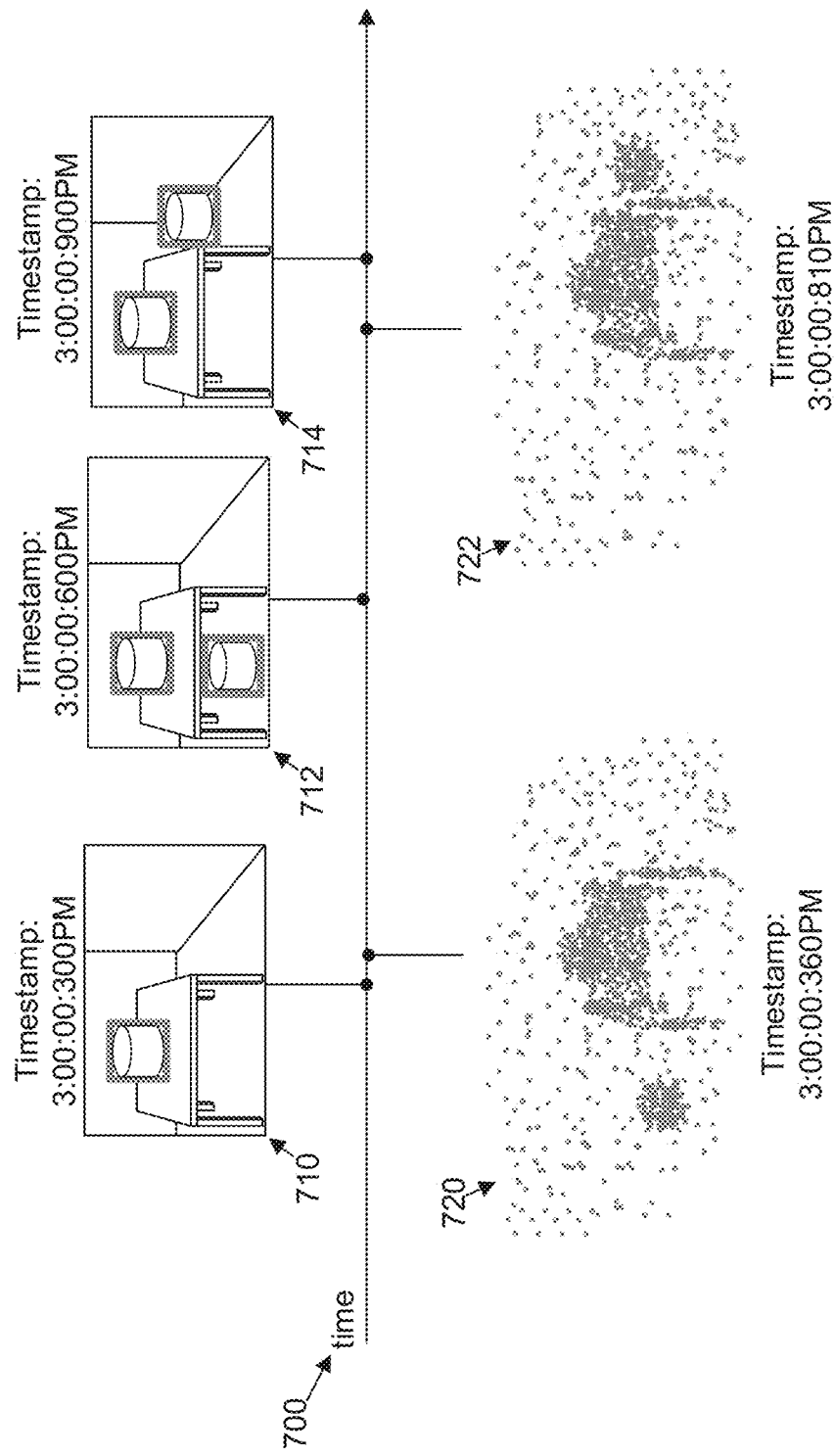
FIG. 7 illustrates sensor data at points in time, in accordance with example embodiments.

FIG. 7 depicts timeline 700 illustrating sensor data samples collected from a first sensor and a second sensor. Timeline 700 includes labeled sample 710, labeled sample 712, and labeled sample 714 collected from the first sensor, e.g., a RGB sensor, at various points along timeline 700. Additionally, timeline 700 includes samples 720 and 722 collected from the second sensor, e.g., a LIDAR sensor, at various points along timeline 700. Different points along timeline 700 indicate that the samples were collected at different points in time.

As mentioned above, with sensors collecting data at potentially different points in time, it may be beneficial to determine time-synchronized subsets of the first and second sensor data so that each data sample from the first sensor has a corresponding data sample from the second sensor and the samples do not depict substantially differing scenes. During the span of time depicted by timeline 700, there are three samples from the first sensor, labeled samples 710, 712, and 714, whereas there are only two samples from the second sensor, samples 720 and 722. Each sample from the first sensor thus does not have a corresponding sample from the second sensor. Furthermore, the scene depicted by labeled sample 712 is not similar to scenes depicted by any of the samples from the second sensor.

In some examples, determining the time-synchronized subsets of the first and second sensor data may involve determining which samples are within a predetermined time threshold of each other. For example, each sample may be timestamped when collected. Labeled sample 710 may have been timestamped at 3:00:00:300 PM, labeled sample 712 at 3:00:00:600 PM, and labeled sample 714 at 3:00:00:900 PM. Sample 720 may have been timestamped at 3:00:00:360 PM and sample 722 may have been timestamped at 3:00:00:810 PM. A threshold time difference of 150 ms may be applied such that samples that were collected or time-stamped to be within 150 ms of each other are considered as corresponding samples, and samples without a corresponding sample may be removed. In the case of timeline 700, labeled sample 710 and sample 720 were collected at 3:00:00:300 PM and 3:00:00:360 PM, respectively, which is within the 150 ms threshold. Additionally, labeled sample 714 and sample 722 were collected at 3:00:00:900 PM and 3:00:00:810 PM, respectively, which is also within the 150 ms threshold. However, labeled sample 712, which was collected at 3:00:00:600 PM, in comparison to the samples 720 and 722 collected from the second sensor at 3:00:00:360 PM and 3:00:00:810 PM, respectively, is not within the 150 ms time threshold for either sample. Therefore, labeled sample 712 may be removed and a proper, time-synchronized subset of the first sensor data may be obtained. Since all the samples of the second sensor data correspond to the time-synchronized subset of the first sensor data, an improper subset of the second sensor data is obtained (that is, all of the data is retained).

Other functions may also be performed to synchronize the data, e.g., cropping. For example, with sensors that have differing fields of view, the first sensor data and/or the second sensor data may be cropped. If the labeled sensor data reflects a smaller field of view than the second sensor data (e.g., in the case of labeled samples 710, 712, and 714, in comparison with samples 720 and 722), then the second sensor data may be cropped. If the labeled sensor data (which comprises first sensor data and first sensor labels) reflects a larger field of view than the second sensor data, then the labeled sensor data may be cropped to the field of view of the second sensor, or alternatively, only the labels inside the field of view of the second sensor are transferred. Further, the sensors may be at various poses when the data is being captured, and the cropped images may then include any overlapping fields of view.

Figure 8:
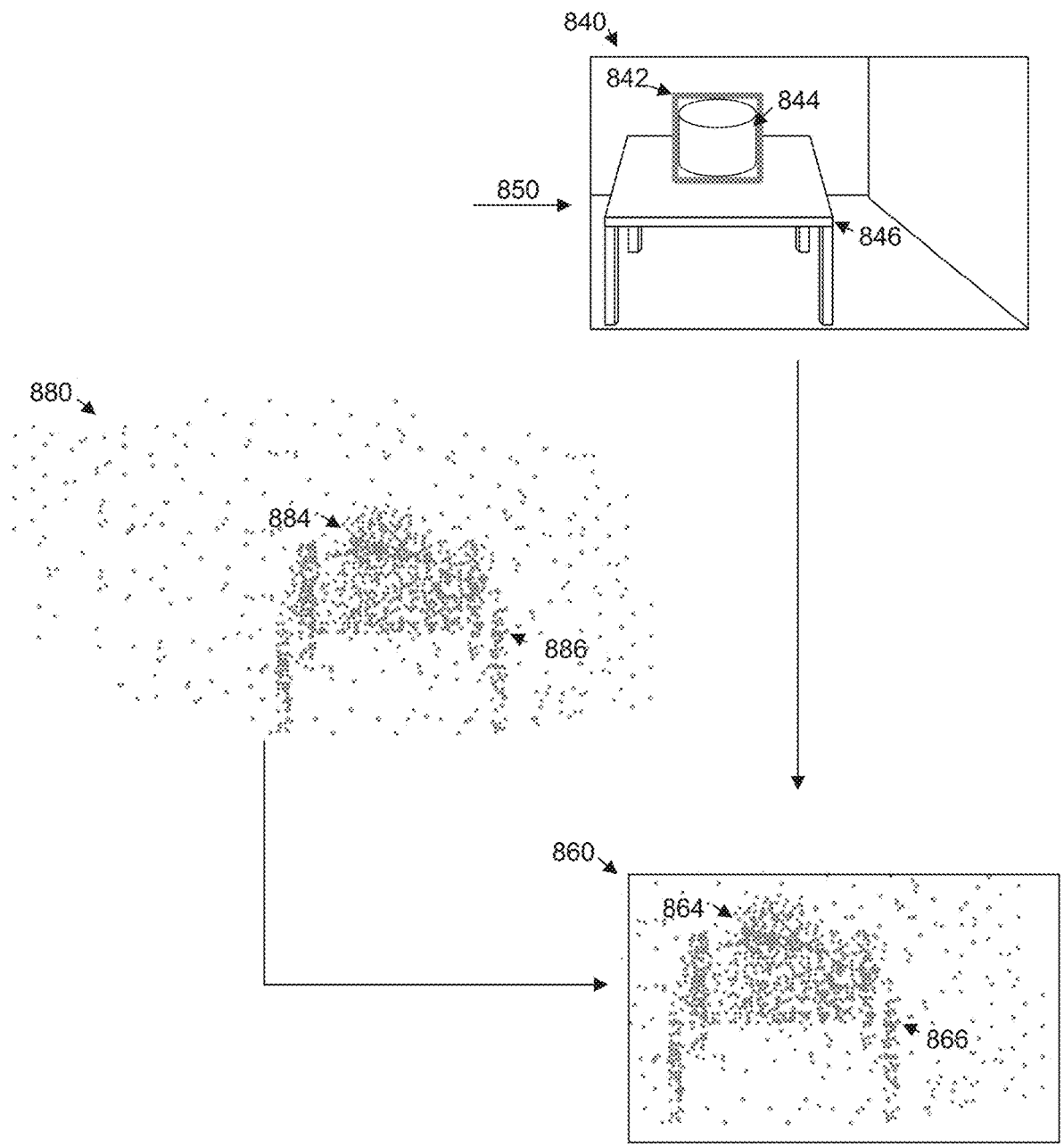
FIG. 8 illustrates cropped sensor data, in accordance with example embodiments.
Figure 9:
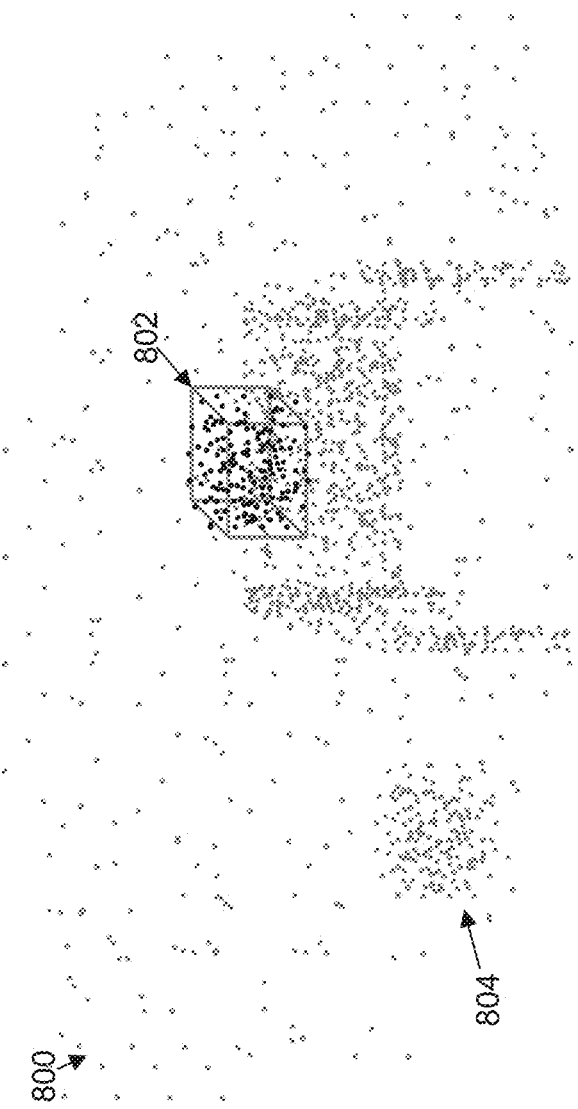
FIG. 9 illustrates labeled sensor data, in accordance with example embodiments.

For example, FIG. 8 depicts cropped sensor data, where the first sensor data is captured from an RGB sensor and the second sensor data is captured from a LIDAR sensor. First sensor data is indicated by sample 840, uncropped second sensor data is indicated by sample 880, and cropped second sensor data is indicated by sample 860. As mentioned above, the sensors may be at various poses when the data is being captured, and in this case, the LIDAR sensor is looking into environment 500 from the point of view indicated by arrow 850. Since the first sensor data has a more narrow field of view than the second sensor data, the second sensor data is cropped. Accordingly, sample 840 is identical to the corresponding uncropped sample, labeled sample 620, with object element 844 corresponding to object element 624, table element 846 corresponding to table element 626, and bounding box 842 corresponding to bounding box 622. However, sample 860, which indicates second sensor data, is not identical to the corresponding uncropped sample, sample 880. Although sample 880 and sample 860 include point cloud clusters 884 and 864, respectively, corresponding to object element 844 and they include point cloud clusters 886 and 866, respectively, corresponding to table element 846 it may be observed that the point cloud cluster of sample 860 is cropped from the original point cloud cluster of sample 880. In other examples, samples may be cropped such that they exclude objects not depicted by the other sample. For example, taking point cloud cluster 640 and sample 840 as an example, point cloud cluster 640 may be cropped such that point cloud cluster 644 is excluded, as it is outside the field of view of sample 860. In general, when a sample has a different field of view than another sample, the cropped samples may include the overlapping fields of view.

Further, the functions may be performed in a different order. For example, the first and second sensor data may be time-synchronized prior to labeling the first sensor data. Time-synchronizing prior to labeling the first sensor data may be more efficient if it is determined that a proper subset of the first sensor data corresponds to the second sensor data (e.g., through comparing the number of samples). In further examples, the first sensor may be cropped prior to being labeled, which may be more efficient if the first sensor data has a larger field of view than the second sensor data.

After synchronization, the bounding boxes labeling the first sensor data may be projected onto the second sensor data to form pseudo-labels. Following the example from FIGS. 5-8, FIG. 9 depicts pseudo-labeled sample 800 captured from the second sensor (e.g., a LIDAR sensor) with a pseudo-label transferred from labeled sample 620. More specifically, pseudo-labeled sample 800 includes the sparse point cloud of sample 640, with bounding box 802. The pseudo-labeled object within bounding box 802 corresponds to object 504 of environment 500. In practice, the 3D bounding box may be a set of coordinates that are representative of the area depicted by the bounding box. Alternatively, the pseudo-labels may be a certain set of points within the point cloud that indicate the object. To calculate the pseudo-labels, depth information may be used. For example, when the first sensor is an RGB-D sensor and the second sensor is a LIDAR sensor (or vice versa), the depth information could be collected from the RGB-D sensor. Alternatively, the depth information could be calculated based on the collected LIDAR data.

Because pseudo-labeled sample 620 does not include a depiction of object 506 nor a label (or prediction) for object 506 of environment 500, no pseudo-label was transferred from labeled sample 620 to pseudo-labeled sample 800 for object 506. Thus, pseudo-labeled sample 800 may have point cloud cluster 804 that corresponds with object 506, but point cloud cluster 804 may not be labeled. In practice, pseudo-labeled sample 800 may or may not have been cropped prior to the label transfer process, and the cropped (or uncropped) data may be incorporated into the training data set, as discussed later.

Other calibration functions may be taken before, during, or after the label transfer blocks of method 400 in general to account for differences between data collected from the first sensor and data collected from the second sensor. For instance, although the first and second sensor could be located at approximately the same location, the samples may not correspond exactly due to sensor pose differences. Accordingly, before the label transfer process, the data from one sensor could be transformed to account for the sensor pose differences. Alternatively, the label transfer process could be adjusted to account for the sensor pose differences. Still alternatively, the transferred labels (after the label transfer process) may be slightly adjusted to account for the sensor pose differences. In other examples, if one sensor has a very wide field of view, the samples may be distorted when compared to that of the other sensor, particularly when the other sensor has a smaller field of view. Consequently, the data may be calibrated before, during, or after the label transfer process to account for these differences.

To improve the accuracy of label transfer, the transferred labels may be subject to validation based on a quality metric. For example, in the case of LIDAR data in pseudo-labeled sample 800, the LIDAR data may be validated by requiring a threshold number of points within the pseudo-label, e.g., the bounding box. As an example, the threshold number of points may be ten points. A bounding box containing less than ten points may not pass verification and the bounding box and/or corresponding data may be discarded. In the case of bounding box 802, the number of points contained within far exceeds ten points, so bounding box 802 may be retained.

Figure 10:
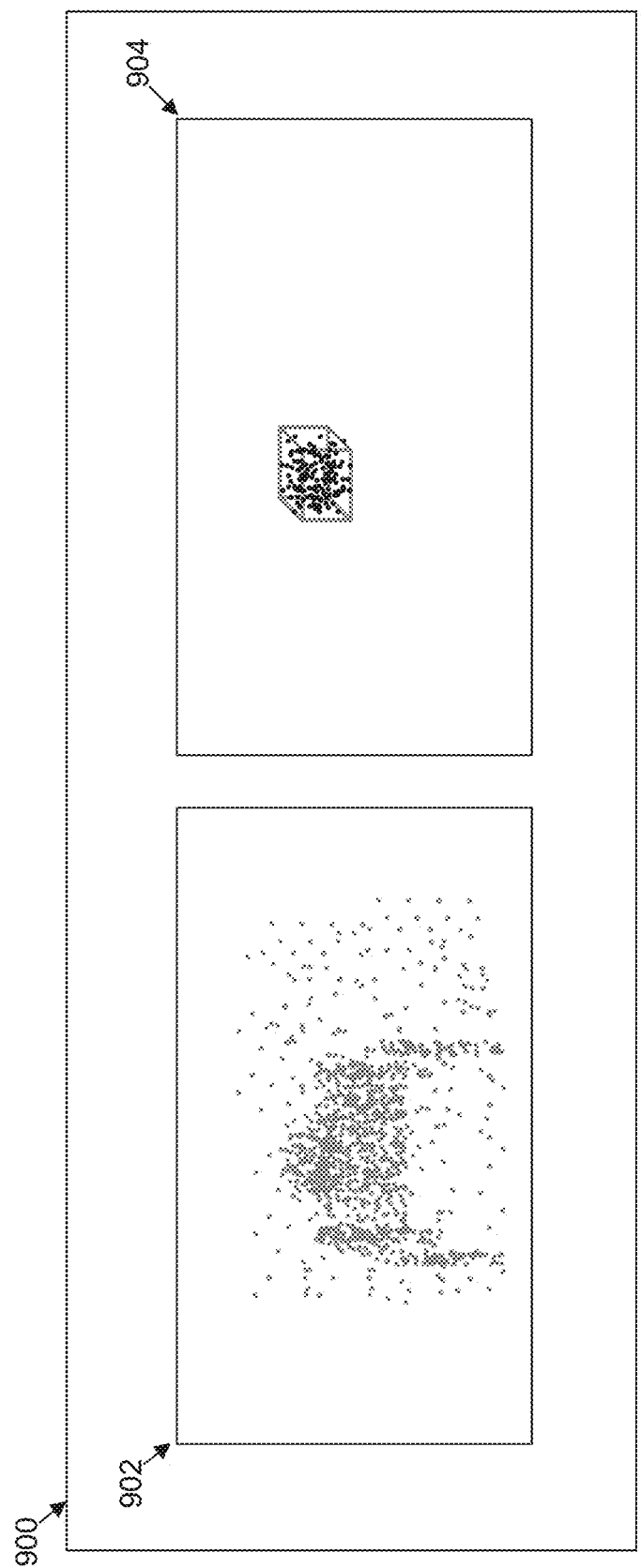
FIG. 10 illustrates a training data set, in accordance with example embodiments.

With the labels transferred and potentially validated, a training data set may be constructed. FIG. 10 depicts training data set 900. Training data set 900 includes sample 902 and pseudo-label 904. Although training data set 900 only depicts one sample, in practice, a training data set may include thousands of training samples comprising data captured from the second sensor and corresponding pseudo-labels transferred from the labeled first sensor data. Data in training data set 900 may include the second sensor data for which labels were transferred. For example, if the time-synchronized sensor data includes only a proper subset of the second sensor data, the training data set 900 may include the proper subset. Further, if some of the second sensor data samples do not have labels (perhaps because the labels did not pass validation), then these samples may be excluded from the training data set.

Sensor data included in training data set 900 may include initial data collected by the second sensor within the field of view of the data collected by the first sensor. For example, sample 902 is cropped from sample 640 since the corresponding data from which the labels were transferred, labeled sample 620, has a smaller field of view. In further examples, samples 720 and 722 may be cropped to the field of view of labeled sample 710 and labeled sample 714, respectively, and the labels may be transferred. The cropped data and transferred labels may then be included in training data set 900. Alternatively, the data may be incorporated into the training data set, and the data may be cropped before the training process.

The corresponding labels, such as pseudo-label 904 corresponding to sample 902, may take various forms. In the case of LIDAR data, the labels may indicate a 3D bounding box (e.g., a set of coordinates) or the labels may indicate which points in the sparse point cloud correspond to the object. Pseudo-label 904 depicts both, although in practice, labels may be the coordinates of the bounding boxes indicating the object or the coordinates of the points indicating the object. In other examples, e.g., if the second sensor is an RGB sensor, the labels may correspond to 2D bounding boxes (e.g., a set of coordinates) or the labels may indicate which pixels in the sample correspond to the object.

A machine learning model may be trained on training data set 900 to output predictions for future samples of data so that the first sensor data and labels or predictions need not be provided in future samples. The machine learning model may incorporate supervised machine learning methods as well as unsupervised, or a combination (e.g., semi-supervised learning). Supervised machine learning models that may be used may include neural networks of various architectures including deep neural networks, wide neural networks, convolutional neural networks, recurrent neural networks, support vector machines, deep residual networks, etc.

In some examples, the data in training data set 900 may be preprocessed before being input into the machine learning model. Continuing with the example of transferring labels from RGB data to LIDAR data, the LIDAR point cloud may be cropped, if the data incorporated into the training data set is not already. Further, the data may be voxelized to reduce the data density and consequently reduce the amount of computing time and power needed to train the model and to predict outputs. These preprocessing functions may be reversed in order, and other preprocessing functions may be incorporated. Further, the preprocessing functions may be done prior to the construction of the training data set, e.g., training data set 900.

In an example process, following any preprocessing functions, a machine learning algorithm may be applied, and calculations may be done to associate points in the point cloud with bounding boxes. Specifically, the example process could involve U-Net, which is an instance segmentation model developed for 2D architectures. In the case of LIDAR data, U-Net could be adapted to use sparse convolutions and take 3D data as inputs. The U-Net may be trained on a training data set such as training data set 900. Further, the process may involve differentiable mean shift and Hough voting to determine the bounding boxes from the points and/or to associate the points with objects.

Because the performance of machine learning models depends heavily on the quality of data that serves as training data, the training data set may be refined to only include better quality data. For example, the training data set may be input into a trained machine learning model or other mathematical equations to calculate confidence levels. Confidence levels may also be calculated based on the quality metric from the validation process. For example, different confidence levels may correspond to different thresholds indicating different numbers of points within bounding boxes. Samples with one or more labels that have less/more points than these thresholds could be indicated as low/high quality labels.

A high confidence training data set may be generated by incorporating the data samples with the highest confidence levels, and this high confidence training data set may be used to train the machine learning model so that the machine learning model outputs potentially more accurate labels. After this initial training with the high confidence training data set, the lower confidence level samples may be labeled through using the trained machine learning model and the highest confidence labels of those labeled samples may be incorporated into the high confidence training set. This process may be repeated so that the data set increases in size and the quality of labels generated by the model improves. In some examples, samples with very low confidence scores may be labeled again through a human-assisted process, and these labeled samples may be incorporated into the high confidence training set to refine the model and improve the quality of labels generated by the model.

Because the performance of machine learning models depends heavily on the quality of data that serves as training data, the training data set may be refined to only include better quality data. For example, the training data set may be input into a trained machine learning model or other mathematical equations to calculate confidence levels. Confidence levels may also be calculated based on the quality metric from the validation process. For example, different confidence levels may correspond to different thresholds indicating different numbers of points within bounding boxes. Samples with one or more labels that have less/more points than these thresholds could be indicated as low/high quality labels.

A high confidence training data set may be generated by incorporating the data samples with the highest confidence levels, and this high confidence training data set may be used to train the machine learning model so that the machine learning model outputs potentially more accurate labels. After this initial training with the high confidence training data set, the lower confidence level samples may be labeled through using the trained machine learning model and the highest confidence labels of those labeled samples may be incorporated into the high confidence training set. This process may be repeated so that the data set increases in size and the quality of labels generated by the model improves. In some examples, samples with very low confidence scores may be labeled again through a human-assisted process, and these labeled samples may be incorporated into the high confidence training set to refine the model and improve the quality of labels generated by the model.

In initial experiments implementing this method using a RGB sensor as a first sensor with labeled data and a LIDAR sensor as a second sensor, parts of the LIDAR samples were cropped from the training data set as the RGB sensor had a smaller field of view than the LIDAR sensor. However, it was observed that if LIDAR data was inputted into a machine learning model (trained with the training data set obtained through the label transfer process), the machine learning model may accurately output labels for the entire field of view, not only the portions that were previously labeled.

In some examples, the process of transferring labels from data of a first sensor to data of a second sensor may be bi-directional. For example, a training set may be generated using second sensor data and second sensor labels that were transferred from labeled first sensor data. A machine learning model trained on the labeled second sensor data may generate labels for further inputs. Then, using the process of transferring labels described herein, the generated second sensor labels may be transferred to labels for first sensor data. A training set may be generated using the first sensor data and first sensor labels that were transferred from the labeled second sensor data. The process could then repeat to generate labels for second sensor data again, and so on.

As mentioned above, the process of transferring labels from data of a first sensor to data from another sensor may differ depending on the type and properties of the first sensor as well as the type and properties of the second sensor. The label transfer process may be rearranged as necessary depending on the type of sensors and the type or types of data collected. Other functions may be added during the process, as dictated by sensor properties, data properties, and the application of the data.

In some examples, the first sensor may have a narrower field of view than the second sensor. Specifically, the first sensor could be a RGB sensor with a narrow field of view and the second sensor could be a RGB sensor with a wide field of view. The second sensor data may be cropped to the field of view of the first sensor prior to generating the training data set. Due to the sensors collecting more similar formats of data, the validation functions may not need to be incorporated into the process. If validation functions are incorporated, the metric for validating may be different from validating label transfer in point cloud data.

In some examples, the first sensor may have a wider field of view than the second sensor. Prior to the label transfer process, the first sensor data may be cropped to the field of view of the second sensor and/or the first sensor data labels outside the field of view of the second sensor may be removed. Alternatively, the first sensor data could be cropped prior to its labeling. In a machine-assisted or human-assisted process, removing the parts of data that are not necessary may help to accelerate the labeling process.

In some examples, the first sensor could be a LIDAR sensor and the second sensor could be a RGB sensor to which the first sensor data labels are being transferred. The LIDAR sensor may have a wider field of view than the RGB sensor. In line with the discussion above, the data and labels from the first sensor (the wider field of view sensor) may be limited to the field of view of the second sensor through cropping or removing, respectively, and this process may occur prior to the label transfer process, or even prior to the process of labeling of the first sensor data.

II. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving first sensor data captured by a first sensor, wherein the first sensor data includes two-dimensional image data and depth data;

receiving a plurality of labels or predictions defining coordinates of one or more two-dimensional bounding boxes of the first sensor data;

receiving second sensor data captured by a second sensor, wherein the second sensor data includes point cloud data;

determining time-synchronized sensor data comprising a subset of the first sensor data and a subset of the second sensor data;

determining, based on the plurality of labels or predictions, the time-synchronized sensor data, and the depth data, a plurality of pseudo-labels corresponding to the second sensor data, wherein the plurality of pseudo-labels define coordinates of one or more three-dimensional bounding boxes based on the one or more two-dimensional bounding boxes and the depth data; and generating a training data set comprising at least the subset of the second sensor data and one or more pseudo-labels from the plurality of pseudo-labels.

2. The method of claim 1, wherein the first sensor is a red green blue depth (RGB-D) camera, wherein the second sensor is a LIDAR sensor.

3. The method of claim 1, wherein the second sensor has a wider field of view than the first sensor.

4. The method of claim 1, wherein the first sensor data represents an area smaller than the second sensor data, and wherein determining the plurality of pseudo-labels corresponding to the second sensor data comprises:

determining, based on the first sensor and the second sensor, cropped second sensor data corresponding to the area represented by the first sensor data.

5. The method of claim 1, wherein the plurality of labels or predictions comprise labels determined by using a human-assisted labeling process.

6. The method of claim 1, wherein the plurality of labels or predictions comprise predictions determined by using an automated prediction process run on a computing device.

7. The method of claim 1, wherein the plurality of predictions or labels indicate one or more object locations in the first sensor data, and wherein the plurality of pseudo-labels indicate one or more object locations in the second sensor data.

8. The method of claim 1, wherein the time-synchronized sensor data comprising a subset of the first sensor data and a subset of the second sensor data is based on a threshold timestamp difference between the first sensor data and the second sensor data.

9. The method of claim 1, wherein the subset the first sensor data is an improper subset of the first sensor data.

10. The method of claim 1, wherein the subset of the second sensor data is an improper subset of the second sensor data.

11. The method of claim 1, wherein the method further comprises before generating the training data set, validating, based at least on the subset of the second sensor data and a quality measure associated with the plurality of pseudo-labels corresponding to the second sensor data, one or more pseudo-labels from the plurality of pseudo-labels and wherein the training data set is generated based on the one or more validated pseudo-labels.

12. The method of claim 11, wherein the second sensor is a LIDAR sensor, wherein the second sensor data includes point cloud data, and wherein the quality measure is a threshold number of points within the point cloud data.

13. The method of claim 1, wherein the method further comprises determining, based at least on the plurality of pseudo-labels, confidence scores, wherein generating the training data set is based on the confidence scores.

14. The method of claim 13, wherein the method further comprises:

determining, based on the confidence scores, a high confidence subset of the second sensor data and a high confidence subset of the plurality of pseudo-labels; and generating a high confidence training data set comprising at least the high confidence subset of the second sensor data and the high confidence subset of the plurality of pseudo-labels, wherein the high confidence training data set is to be used in supervised machine learning.

15. A system comprising:

a first sensor;

a second sensor; and a computing device configured to:

receive first sensor data captured by a first sensor, wherein the first sensor data includes two-dimensional image data and depth data;

receive a plurality of labels or predictions defining coordinates of one or more two-dimensional bounding boxes of the first sensor data;

receive second sensor data captured by a second sensor, wherein the second sensor data includes point cloud data;

determine time-synchronized sensor data comprising a subset of the first sensor data and a subset of the second sensor data;

determine, based on the plurality of labels or predictions, the time-synchronized sensor data, and the depth data, a plurality of pseudo-labels corresponding to the second sensor data, wherein the plurality of pseudo-labels define coordinates of one or more three-dimensional bounding boxes based on the one or more two-dimensional bounding boxes and the depth data; and generate a training data set comprising at least the subset of the second sensor data and one or more pseudo-labels from the plurality of pseudo-labels.

16. The system of claim 15, wherein the computing device is further configured to:

receive additional second sensor data captured by the second sensor;

receive a second plurality of predictions corresponding to the additional second sensor data, wherein the second plurality of predictions was generated by a machine learning model trained on the plurality of pseudo-labels, wherein the second plurality of predictions were generated by applying the machine learning model to the additional second sensor data;

receive additional first sensor data captured by the first sensor;

determine additional time-synchronized sensor data comprising a subset of the additional second sensor data and a subset of the additional first sensor data;

determine, based on the second plurality of predictions and the additional time-synchronized sensor data, an additional plurality of pseudo-labels corresponding to the additional first sensor data; and generate an additional training data set comprising at least the subset of the additional first sensor data and an additional one or more pseudo-labels from the additional plurality of pseudo-labels.

17. A non-transitory computer readable medium comprising program instructions executable by at least one processor to cause the at least one processor to perform functions comprising:

receiving first sensor data captured by a first sensor, wherein the first sensor data includes two-dimensional image data and depth data;

receiving a plurality of labels or predictions defining coordinate of one or more two-dimensional bounding boxes of the first sensor data;

receiving second sensor data captured by a second sensor, wherein the second sensor data includes point cloud data;

determining time-synchronized sensor data comprising a subset of the first sensor data and a subset of the second sensor data;

determining, based on the plurality of labels or predictions, the time-synchronized sensor data and the depth data, a plurality of pseudo-labels corresponding to the second sensor data, wherein the plurality of pseudo-labels define coordinates of one or more three-dimensional bounding boxes based on the one or more two-dimensional bounding boxes and the depth data; and generating a training data set comprising at least the subset of the second sensor data and one or more pseudo-labels from the plurality of pseudo-labels.

18. The method of claim 1, wherein the one or more two-dimensional bounding boxes are two-dimensional rectangles, and the one or more three-dimensional bounding boxes are three-dimensional rectangles.

* * * * *